United States Patent
He et al.

(10) Patent No.: US 10,382,102 B1
(45) Date of Patent: Aug. 13, 2019

(54) 5G-ORIENTED MULTIDIMENSIONAL ADAPTIVE MIMO SYSTEM AND METHOD THEREOF FOR ADJUSTING RADIATING MODES OF ANTENNA PORTS

(71) Applicant: WUHAN UNIVERSITY, Hubei (CN)

(72) Inventors: Yigang He, Hubei (CN); Guolong Shi, Hubei (CN); Hui Zhang, Hubei (CN); Bing Li, Hubei (CN); Baiqiang Yin, Hubei (CN); Liulu He, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 16/038,176

(22) Filed: Jul. 17, 2018

(30) Foreign Application Priority Data

Mar. 26, 2018 (CN) .......................... 2018 1 0254286

(51) Int. Cl.
*H04B 7/0413* (2017.01)
*H04B 7/06* (2006.01)

(52) U.S. Cl.
CPC ......... *H04B 7/0413* (2013.01); *H04B 7/0617* (2013.01)

(58) Field of Classification Search
CPC .................. H04B 7/0413; H04B 7/0617
See application file for complete search history.

(56) References Cited

U.S. PATENT DOCUMENTS

| 7,170,924 B2 * | 1/2007 | Corbaton | H04B 1/712 375/148 |
| 2018/0076906 A1 * | 3/2018 | Naseef | H04B 17/102 |

FOREIGN PATENT DOCUMENTS

CN 100474786 4/2009

OTHER PUBLICATIONS

Wang et al., "Spatial Variation Analysis for Measured Indoor Massive MIMO Channels," in IEEE Access, vol. 5, pp. 20828-20840 (Year: 2017).*
Nadeem et al., "Design of 5G Full Dimension Massive MIMO Systems," in IEEE Transactions on Communications, vol. 66, No. 2, pp. 726-740, Oct. 13, 2017 (Year: 2017).*

* cited by examiner

*Primary Examiner* — Michelle M Koeth
(74) *Attorney, Agent, or Firm* — JCIPRNET

(57) ABSTRACT

A 5G-oriented multidimensional adaptive MIMO system including a transmitting antenna array, a first rotary table, a broadband vector signal generator, a receiving antenna array, a second rotary table, a broadband vector signal analyzer and a data acquisition terminal is provided. The broadband vector signal generator and the broadband vector signal analyzer are respectively connected with the transmitting antenna array and the receiving antenna array. The data acquisition terminal is connected with the broadband vector signal generator and the broadband vector signal analyzer. In addition, a method for adjusting radiating modes of antenna ports by using the 5G-oriented multidimensional adaptive MIMO system is also provided.

6 Claims, 1 Drawing Sheet

5G-ORIENTED MULTIDIMENSIONAL ADAPTIVE MIMO SYSTEM AND METHOD THEREOF FOR ADJUSTING RADIATING MODES OF ANTENNA PORTS

CROSS-REFERENCE TO RELATED APPLICATION

This application claims the priority benefit of China application serial no. 201810254286.4, filed on Mar. 26, 2018. The entirety of the above-mentioned patent application is hereby incorporated by reference herein and made a part of this specification.

BACKGROUND OF THE INVENTION

1. Field of the Invention

The present invention generally relates to a 5th Generation (5G)-oriented multidimensional adaptive Multiple Input Multiple Output (MIMO) system and a method thereof for adjusting radiating modes of antenna ports, which controls the radiating modes of the antenna ports by using the number, positions, modes and corresponding weight vectors of antenna elements.

2. Description of Related Art

A large-scale Multiple Input Multiple Output (MIMO) base station is equipped with a large number of antennas (generally dozens to hundreds), so as to obtain an extra system gain. An MIMO technology is active in the field of researching and standardizing a 5th Generation (5G) wireless communication system. As the MIMO technology may deal with the increase of wireless data services and improve the reliability of a wireless system, it has always been a subject to which people paid attention in the past twenty years. From passengers' experience, the next generation of traffic systems of high speed railways, urban rail transits and metros has requirements for the broadband and the data transmission rate in addition to the requirement for 5G, so that the large-scale MIMO technology has become an inevitable trend of development of the next generation of wireless communication systems.

In order to be compatible with the Long Term Evolution (LTE) standard of the existing 3rd Generation Partnership Project (3GPP), less than ten linearly placed antennas are deployed in each of most of the existing MIMO base stations. Although it is very important to correspondingly improve the spectral efficiency, the data transmission efficiency may also be greatly improved by expanding these systems to possible orders of magnitudes. The large-scale MIMO technology is a key driving force for the next generation of cellular systems, but there are still many actual challenges to its successful deployment. One main challenge is that the number of antennas provided at the tower top of the base station is limited by a base station shape factor and an LTE carrier frequency. In order to overcome the difficulty, the 3GPP suggests using a 2D uniform planar array which may provide much more analytic information in comparison with a traditional Uniform Linear Array (ULA). In addition to the emergence of a large-scale antenna array, base transceiver station equipment has been positioned at a position far away from a passive antenna element array, and analog parts of an amplifier and a phase shifter have been positioned near remote wireless interfaces of passive antenna elements in the past ten years. In comparison with the traditional LTE system, the number of multidimensional MIMO antennas is determined by the planar structure of the base station. The massive antenna elements in the 2D planar array structure provide a large number of spatial separation transmission links for users.

SUMMARY OF THE INVENTION

In view of the above-mentioned shortcomings of existing large-scale Multiple Input Multiple Output (MIMO) deployment, the present invention provides a 5th generation (5G)-oriented multidimensional adaptive MIMO system. Compared with a traditional uniform linear array, an adopted two-dimensional planar array structure is more flexible in shape factor and may provide much more analytic information. An antenna radiating mode is dynamically adjusted by controlling a weight vector applied to an antenna element. In addition, the large-scale compact antenna array structure improves the space relevancy of test systems.

In order to solve the above-mentioned technical problem, the present invention adopts the following technical solution:

a 5G-oriented multidimensional adaptive MIMO system, including a transmitting antenna array, a first rotary table, a broadband vector signal generator, a receiving antenna array, a second rotary table, a broadband vector signal analyzer and a data acquisition terminal;

the transmitting antenna array is connected with the first rotary table which is configured to control the transmitting antenna array to rotate 360 degrees; the broadband vector signal generator is connected with the transmitting antenna array, and is configured to generate a wireless signal, and the transmitting antenna array is configured to transmit the wireless signal; the receiving antenna array is connected with the second rotary table which is configured to control the receiving antenna array to rotate 360 degrees, and is configured to receive the wireless signal transmitted by the transmitting antenna array; the broadband vector signal analyzer is connected with the receiving antenna array, and is configured to analyze the wireless signal received by the receiving antenna array; and the data acquisition terminal is connected with the broadband vector signal generator and the broadband vector signal analyzer, and is configured to acquire, store and calculate wireless channel estimation parameters and received signal to noise ratio estimation parameters.

Further, the transmitting antenna array includes $N_{BP}$ transmitting antennas U11, . . . , U1N$_{BP-1}$, U1N$_{BP}$, wherein $N_{BP}$ is the number of the transmitting antennas in the transmitting antenna array; each transmitting antenna corresponds to one group of antenna elements disposed in a vertical domain; the transmitting antenna U11 includes an antenna port U111, weight vectors U121 ($\beta_1(\theta_e)$), U122 ($\beta_2(\theta_e)$), . . . , U12Ne ($\beta_{Ne}(\theta_e)$), and antenna elements U131, U132, . . . , U13Ne, and Ne is the number of the antenna elements or weight vectors corresponding to each transmitting antenna; and the rest of the transmitting antennas are done in the same manner.

Further, in each transmitting antenna, the antenna port is positioned at the top end of the transmitting antenna, and is configured to transmit a wireless signal of the transmitting antenna; the weight vectors are configured to control radiating angles of the antenna elements in target directions; the multiple antenna elements form a column of the transmitting antenna; all the antenna elements carry the same signals, and focus the directions on the receiving antenna array according to the corresponding radiating angles.

Further, in each transmitting antenna, the antenna elements are longitudinally disposed inside the transmitting antenna in an equal spacing manner.

Further, the first rotary table and the second rotary table are both circular, and respectively control the transmitting antenna array and the receiving antenna array to clockwise or anticlockwise rotate 360 degrees.

The present invention further provides a method for adjusting radiating modes of antenna ports by using the above-mentioned 5G-oriented multidimensional adaptive MIMO system. The method includes the following steps:

S1: expressing a correlation among the antenna ports as antenna element matrixes forming the antenna ports and weight vector functions corresponding thereto by optimizing weight vectors of antenna elements; and S2: dynamically adjusting the radiating modes of the antenna ports by controlling antenna element azimuth angles, antenna element elevation angles and antenna element downward inclination angles which are applied to the antenna elements.

According to the above-mentioned solution, the weight vectors of the antenna elements in the step S1 are adjusted through a data acquisition terminal according to an adaptive algorithm which adopts a recursive least-squares algorithm disclosed in CN100474786.

According to the above-mentioned solution, the radiating modes of the antenna ports in the step S2 are expressed by the formula below:

$$\overline{X} = \overline{W}\overline{V} = \begin{bmatrix} v_1^1 & v_1^2 & \ldots & v_1^j \\ v_2^1 & v_2^2 & \ldots & v_2^j \\ \ldots & \ldots & \ldots & \ldots \\ v_i^1 & v_i^2 & \ldots & v_i^j \end{bmatrix} \begin{bmatrix} w_1^1 & w_1^2 & \ldots & w_1^j \\ w_2^1 & w_2^2 & \ldots & w_2^j \\ \ldots & \ldots & \ldots & \ldots \\ w_j^1 & w_j^2 & \ldots & w_j^j \end{bmatrix}$$

where $\overline{W}$ is a weight vector matrix of $N_e \times N_{BP}$ antenna elements, and $\overline{V}$ is a radiating response matrix of the $N_e \times N_{BP}$ antenna elements;

the radiating response $v_i^j$ of the $j^{th}$ antenna element in the $i^{th}$ antenna port is expressed as:

$$v_i^j = \exp\left(2\pi\left((i-1)\frac{d_y}{\lambda}\sin\phi\sin\theta + (j-1)\frac{d_z}{\lambda}\cos\theta\right)\right)$$

where $d_y$ is a horizontal distance between the antenna ports, $d_z$ is a vertical distance between the antenna elements, $\phi$ is the antenna element azimuth angle, and $\theta$ is the antenna element elevation angle;

the weight vector $w_i^j$ of the $j^{th}$ antenna element in the $i^{th}$ antenna port is expressed as:

$$w_i^j = \frac{1}{\sqrt{N_e N_{BP}}}\exp\left(-2\pi\left((i-1)\frac{d_y}{\lambda}\sin\theta_e + (j-1)\frac{d_z}{\lambda}\cos\theta_e\right)\right)$$

where $\theta_e$ is the antenna element downward inclination angle.

The correlation among the antenna ports was expressed as:

$$R_{y,z} = \exp\left(\frac{\phi}{\phi_{3dB}}\right)^2 + i2\pi\left[\frac{d_y}{\lambda}\sin\phi\sin\theta + \frac{d_z}{\lambda}\cos\theta\right]$$

Compared with the prior art, the present invention has the beneficial effects that:

1. compared with the traditional uniform linear array, the two-dimensional planar array structure adopted by the present invention is more flexible in shape factor and may provide much more analytic information, and the large-scale compact antenna array structure improves the spatial correlation of test systems;

2. in the multidimensional channel modeling research, channels between the whole antenna ports, instead of channels between units forming these ports, are considered; approximate antenna port radiating modes are used; the correlation among the antenna ports is expressed as the antenna element matrixes forming the ports and weight vector functions corresponding thereto;

3. an active antenna system having the two-dimensional planar array structure not only allows a large number of antenna elements to be packaged, but also provides the adaptive electronic beam forming capacity; wireless resources are based on the antenna ports; each antenna port is mapped to one group of antenna elements arrayed along a vertical direction; and the antenna radiating modes are dynamically adjusted by controlling the azimuth angles, the elevation angles and the downward inclination angles which are applied to the antennas.

DESCRIPTION OF THE EMBODIMENTS

The present invention is further described below with reference to the accompanying drawings and embodiments.

Figure 1:
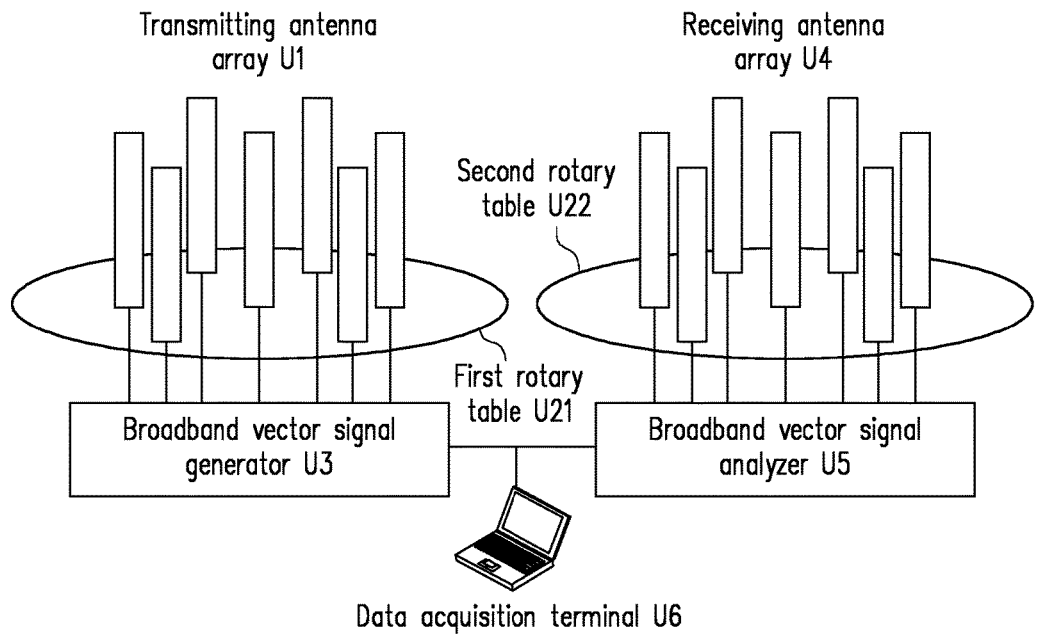
FIG. 1 is a schematic diagram of a structure of a 5th Generation (5G)-oriented multidimensional adaptive Multiple Input Multiple Output (MIMO) test system of the present invention.

Referring to FIG. 1, a 5th Generation (5G)-oriented multidimensional adaptive Multiple Input Multiple Output (MIMO) system of the present invention includes a transmitting antenna array U1, a first rotary table U21, a broadband vector signal generator U3, a receiving antenna array U4, a second rotary table U22, a broadband vector signal analyzer U5 and a data acquisition terminal U6.

The transmitting antenna array U1 is connected with the first rotary table U21 which is configured to control the transmitting antenna array U1 to rotate 360 degrees; the broadband vector signal generator U3 is connected with the transmitting antenna array U1, and is configured to generate a wireless signal, and the transmitting antenna array U1 is configured to transmit the wireless signal; the receiving antenna array U4 is connected with the second rotary table U22 which is configured to control the receiving antenna array U4 to rotate 360 degrees, and is configured to receive the wireless signal transmitted by the transmitting antenna array U1; the broadband vector signal analyzer U5 is connected with the receiving antenna array U4, and is configured to analyze the wireless signal received by the receiving antenna array U4; and the data acquisition terminal U6 is connected with the broadband vector signal generator U3 and the broadband vector signal analyzer U5, and is configured to acquire, store and calculate wireless signal data of the broadband vector signal generator and the broadband vector signal analyzer.

The first rotary table U21 and the second rotary table U22 are both circular, and may clockwise or anticlockwise rotate 360 degrees.

Figure 2:
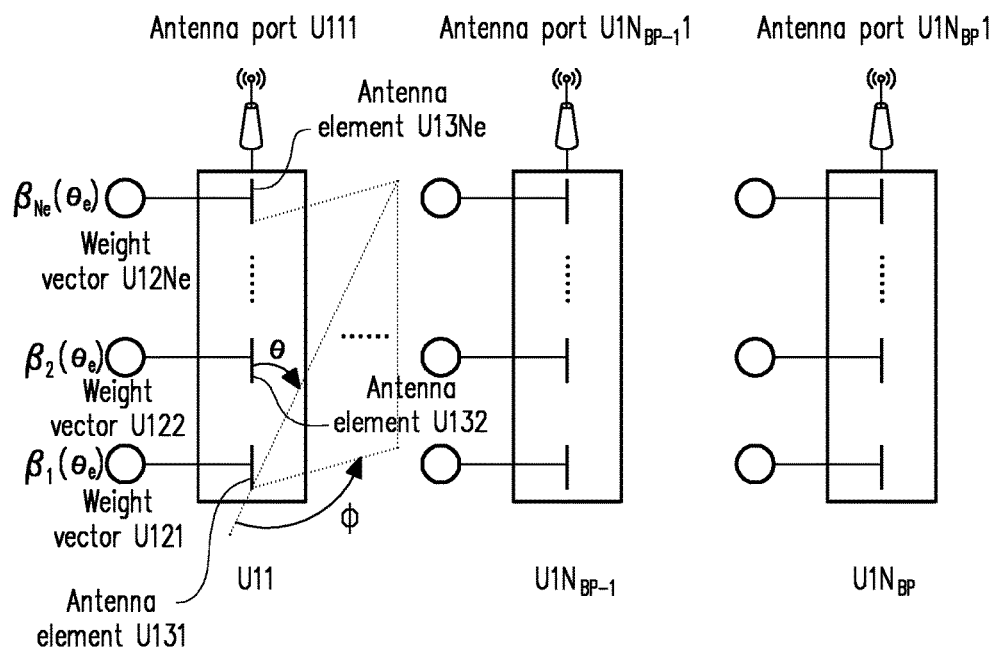
FIG. 2 is a schematic diagram of vertical polarization arrangement of $N_{BP}$ groups of antenna elements of the present invention.

Referring to FIG. 2, the transmitting antenna array U1 includes $N_{BP}$ transmitting antennas U11, . . . , U1$N_{BP-1}$, U1N$_{BP}$, wherein N$_{BP}$ is the number of the transmitting antennas in the transmitting antenna array U1, and may range from 3 to 20; each transmitting antenna corresponds to one group of antenna elements disposed in a vertical domain. The transmitting antenna U11 includes an antenna port U111, weight vectors U121 ($\beta_1(\theta_e)$), U122 ($\beta_2(\theta_e)$), ..., U12Ne ($\beta_{Ne}(\theta_e)$), and antenna elements U131, U132, ..., U13Ne, and Ne is the number of the antenna elements or weight vectors corresponding to each transmitting antenna. The rest of the transmitting antennas are done in the same manner.

The antenna port U111 is positioned at the top end of the transmitting antenna U11, and is configured to transmit the wireless signal of the transmitting antenna U11; the weight vectors U121 ($\beta_1(\theta_e)$), U122 ($\beta_2(\theta_e)$), ..., U12Ne ($\beta_{Ne}(\theta_e)$) are respectively configured to control radiating angles of the antenna elements U131, U132, ..., U13Ne in target directions; the multiple antenna elements U131, U132, ..., U13Ne form a column of the transmitting antenna U11; and all the antenna elements carry the same signals, and focus the directions on the receiving antenna array according to the corresponding radiating angles.

The antenna elements U131, U132, ..., U13Ne are longitudinally disposed inside the transmitting antenna U11 in an equal spacing manner, and a longitudinal distance d$_z$ is a vertical distance between the antenna elements.

The radiating modes of the antenna ports are determined by the number, positions, modes and corresponding weight vectors of the antenna elements in each transmitting antenna, and are Rained by stacking antenna element radiating modes and transmitting antenna array factors.

The antenna element matrixes forming the antenna ports may be expressed by the formula below:

$$\overline{X} = \overline{W}\overline{V} = \begin{bmatrix} v_1^1 & v_1^2 & \dots & v_1^j \\ v_2^1 & v_2^2 & \dots & v_2^j \\ \dots & \dots & \dots & \dots \\ v_i^1 & v_i^2 & \dots & v_i^j \end{bmatrix} \begin{bmatrix} w_1^1 & w_1^2 & \dots & w_1^j \\ w_2^1 & w_2^2 & \dots & w_2^j \\ \dots & \dots & \dots & \dots \\ w_j^1 & w_j^2 & \dots & w_j^j \end{bmatrix}$$

where $\overline{W}$ is a weight vector matrix of $N_e \times N_{BP}$ antenna elements, and $\overline{V}$ is a radiating response matrix of the $N_e \times N_{BP}$ antenna elements.

The radiating response $v_i^j$ of the $j^{th}$ antenna element in the $i^{th}$ antenna port is expressed as:

$$v_i^j = \exp\left(2\pi\left((i-1)\frac{d_y}{\lambda}\sin\phi\sin\theta + (j-1)\frac{d_z}{\lambda}\cos\theta\right)\right)$$

where d$_y$ is a horizontal distance between the antenna ports, d$_z$ is the vertical distance between the antenna elements, $\phi$ is an antenna element azimuth angle, and $\theta$ is an antenna element elevation angle.

The weight vector $w_i^j$ of the $j^{th}$ antenna element in the $i^{th}$ antenna port is expressed as:

$$w_i^j = \frac{1}{\sqrt{N_e N_{BP}}} \exp\left(-2\pi\left((i-1)\frac{d_y}{\lambda}\sin\theta_e + (j-1)\frac{d_z}{\lambda}\cos\theta_e\right)\right)$$

where $\theta_e$ is an antenna element downward inclination angle.

The correlation among the antenna ports was expressed as:

$$R_{y,z} = \exp\left(\frac{\phi}{\phi_{3dB}}\right)^2 + i2\pi\left[\frac{d_y}{\lambda}\sin\phi\sin\theta + \frac{d_z}{\lambda}\cos\theta\right]$$

The data acquisition terminal U6 adjusts the weight vectors U121 ($\beta_1(\theta_e)$), U122 ($\beta_2(\theta_e)$), ..., U12Ne ($\beta_{Ne}(\theta_e)$) of the antenna elements according to an adaptive algorithm which adopts a recursive least-squares algorithm disclosed in CN100474786.

The weight vectors U121 ($\beta_1(\theta_e)$), U122 ($\beta_2(\theta_e)$), ..., U12Ne ($\beta_{Ne}(\theta_e)$) of the antenna elements adjust the radiating modes of the antenna ports by controlling the antenna element azimuth angles $\phi$, the antenna element elevation angles $\theta$ and the antenna element downward inclination angles $\theta_e$.

The 5G-oriented multidimensional adaptive MIMO system of the present invention expresses the correlation among the antenna ports as relevant matrixes of the antenna elements and weight vector functions corresponding thereto by optimizing the weight vectors of the antenna elements, and dynamically adjusts the radiating modes of the antenna ports by controlling the antenna element azimuth angles, the antenna element elevation angles and the antenna element downward inclination angles which are applied to the antenna elements. The radiating modes of the antenna ports are determined by the number, positions, modes and corresponding weight vectors of the antenna elements in each transmitting antenna, and are formed by stacking antenna element radiating modes and transmitting antenna array factors.

Compared with the traditional uniform linear array, the two-dimensional planar array structure adopted by the present invention is more flexible in shape factor and may provide much more analytic information, and the large-scale compact antenna array structure improves the spatial correlation of test systems.

It will be apparent to those skilled in the art that various modifications and variations can be made to the present invention. If these modifications and variations fall within the scope of the claims of the present invention and equivalent technologies thereof, then the modifications and variations are also within the scope of protection of the present invention. Contents not described in detail in the description are prior arts well known to those skilled in the art.

What is claimed is:

1. A 5th Generation (5G)-oriented multidimensional adaptive Multiple Input Multiple Output (MIMO) system, comprising a transmitting antenna array, a first rotary table, a broadband vector signal generator, a receiving antenna array, a second rotary table, a broadband vector signal analyzer and a data acquisition terminal, wherein the transmitting antenna array is connected with the first rotary table which is configured to control the transmitting antenna array to rotate 360 degrees, wherein the broadband vector signal generator is connected with the transmitting antenna array and is configured to generate a wireless signal, and the transmitting antenna array is configured to transmit the wireless signal, wherein the receiving antenna array is connected with the second rotary table which is configured to control the receiving antenna array to rotate 360 degrees, wherein the receiving antenna array is configured to receive the wireless signal transmitted by the transmitting antenna array, wherein the broadband vector signal analyzer is connected with the receiving antenna array and is configured to analyze the wireless signal received by the receiving antenna array, and wherein the data acquisition terminal is connected with the broadband vector signal generator and the broadband vector signal analyzer, and the data acquisition terminal is configured to acquire, store and calculate wireless signal data, wherein the transmitting antenna array comprises $N_{BP}$ transmitting antennas U11, . . . , U1$N_{BP-1}$, U1$N_{BP}$, wherein $N_{BP}$ is the number of the transmitting antennas in the transmitting antenna array, wherein each transmitting antenna corresponds to one group of antenna elements disposed in a vertical domain, wherein the transmitting antenna U11 comprises an antenna port U111, a plurality of weight vectors U121 ($\beta_1(\theta_e)$), U122 ($\beta_2(\theta_e)$), . . . , U12Ne ($\beta_{Ne}(\theta_e)$), and a plurality of antenna elements U131, U132, . . . , U13Ne, and Ne is the number of the antenna elements or the weight vectors corresponding to each transmitting antenna, and the rest of the transmitting antennas are done in the same manner, wherein $\theta_e$ is an antenna element downward inclination angle, and $\beta_1, \beta_2, \ldots, \beta_{Ne}$ are constants, wherein the data acquisition terminal is configured to dynamically adjusting the radiating modes of the antenna ports by controlling an antenna element azimuth angle, an antenna element elevation angle and the antenna element downward inclination angle $\theta_e$ which are applied to the antenna elements, wherein the radiating modes of the antenna ports are expressed by the formula below:

$$\overline{X} = \overline{W}\overline{V} = \begin{bmatrix} v_1^1 & v_1^2 & \ldots & v_1^j \\ v_2^1 & v_2^2 & \ldots & v_2^j \\ \ldots & \ldots & \ldots & \ldots \\ v_i^1 & v_i^2 & \ldots & v_i^j \end{bmatrix} \begin{bmatrix} w_1^1 & w_1^2 & \ldots & w_1^j \\ w_2^1 & w_2^2 & \ldots & w_2^j \\ \ldots & \ldots & \ldots & \ldots \\ w_i^1 & w_i^2 & \ldots & w_i^j \end{bmatrix},$$

wherein $\overline{W}$ is a weight vector matrix of $N_e \times N_{BP}$ antenna elements, and $\overline{V}$ is a radiating response matrix of the $N_e \times N_{BP}$ antenna elements, wherein a radiating response $v_i^j$ of the $j^{th}$ antenna element in the $i^{th}$ antenna port is expressed as:

$$v_i^j = \exp\left(2\pi\left((i-1)\frac{d_y}{\lambda}\sin\phi\sin\theta + (j-1)\frac{d_z}{\lambda}\cos\theta\right)\right),$$

wherein the weight vector $w_i^j$ of the $j^{th}$ antenna element in the $i^{th}$ antenna port is expressed as:

$$w_i^j = \frac{1}{\sqrt{N_e N_{BP}}} \exp\left(-2\pi\left((i-1)\frac{d_y}{\lambda}\sin\theta_e + (j-1)\frac{d_z}{\lambda}\cos\theta_e\right)\right),$$

wherein $d_y$ is a horizontal distance between the antenna ports, and $d_z$ is a vertical distance between the antenna elements, $\phi$ is an antenna azimuth angle, and $\theta$ is an antenna element elevation angle.

2. The 5G-oriented multidimensional adaptive MIMO system according to claim 1, wherein in each transmitting antenna, the antenna port is positioned at a top end of the transmitting antenna, and is configured to transmit a wireless signal of the transmitting antenna; the weight vectors are configured to control radiating angles of the antenna elements in target directions; multiple antenna elements form a column of the transmitting antenna, all the antenna elements of the transmitting antenna carry the same signals and focus the directions on the receiving antenna array according to the corresponding radiating angles.

3. The 5G-oriented multidimensional adapt MIMO system according to claim 1, wherein in each transmitting antenna, the antenna elements are longitudinally disposed inside the transmitting antenna in an equal spacing manner.

4. The 5G-oriented multidimensional adaptive MIMO system according to claim 1, wherein the first rotary table and the second rotary table are both circular, and respectively control the transmitting antenna array and the receiving antenna array to clockwise or anticlockwise rotate 360 degrees.

5. A method for adjusting radiating modes of antenna ports by using a 5G-oriented multidimensional adaptive MIMO system comprising a transmitting antenna array, a first rotary table, a broadband vector signal generator, a receiving antenna array, a second rotary table, a broadband vector signal analyzer and a data acquisition terminal, wherein the transmitting antenna array is connected with the first rotary table which is configured to control the transmitting antenna array to rotate 360 degrees, wherein the broadband vector signal generator is connected with the transmitting antenna array and is configured to generate a wireless signal, and the transmitting antenna array is configured to transmit the wireless signal, wherein the receiving antenna array is connected with the second rotary table which is configured to control the receiving antenna array to rotate 360 degrees, wherein the receiving antenna array is configured to receive the wireless signal transmitted by the transmitting antenna array, wherein the broadband vector signal analyzer is connected with the receiving antenna array and is configured to analyze the wireless signal received by the receiving antenna array, wherein the data acquisition terminal is connected with the broadband vector signal generator and the broadband vector signal analyzer, and the data acquisition terminal is configured to acquire, store and calculate wireless signal data, wherein the method comprises the following steps:

S1: expressing a correlation among the antenna ports as a plurality of antenna element matrixes forming the antenna ports and a plurality of weight vector functions corresponding thereto by optimizing a plurality of weight vectors of a plurality of antenna elements, wherein the correlation among the antenna ports is expressed as:

$$R_{y,z} = \exp\left(\frac{\phi}{\phi_{3dB}}\right)^2 + i2\pi\left[\frac{d_y}{\lambda}\sin\phi\sin\theta + \frac{d_z}{\lambda}\cos\theta\right],$$

wherein $d_y$ is a horizontal distance between the antenna ports, and $d_z$ is a vertical distance between the antenna elements, $\phi$ is an antenna azimuth angle, $\theta$ is an antenna element elevation angle, and $\phi_{3\,dB}$ is the half-power beamwidth antenna element azimuth angle; and S2: dynamically adjusting the radiating modes of the antenna ports by controlling the antenna element azimuth angle, the antenna element elevation angle and an antenna element downward inclination angle which are applied to the antenna elements, wherein the radiating modes of the antenna ports in the step S2 are expressed by the formula below:

$$\overline{X} = \overline{W}\overline{V} = \begin{bmatrix} v_1^1 & v_1^2 & \cdots & v_1^j \\ v_2^1 & v_2^2 & \cdots & v_2^j \\ \cdots & \cdots & \cdots & \cdots \\ v_i^1 & v_i^2 & \cdots & v_i^j \end{bmatrix} \begin{bmatrix} w_1^1 & w_1^2 & \cdots & w_1^j \\ w_2^1 & w_2^2 & \cdots & w_2^j \\ \cdots & \cdots & \cdots & \cdots \\ w_i^1 & w_i^2 & \cdots & w_i^j \end{bmatrix},$$

wherein $\overline{W}$ is a weight vector matrix of $N_e \times N_{BP}$ antenna elements, $N_{BP}$ being the number of the transmitting antennas in the transmitting antenna array, $N_e$ being the number of antenna elements or the weight vectors corresponding to each transmitting antenna, and $\overline{V}$ is a radiating response matrix of the $N_e \times N_{BP}$ antenna elements, wherein a radiating response $v_i^j$ of the $j^{th}$ antenna element in the $i^{th}$ antenna port is expressed as:

$$v_i^j = \exp\left(2\pi\left((i-1)\frac{d_y}{\lambda}\sin\phi\sin\theta + (j-1)\frac{d_z}{\lambda}\cos\theta\right)\right),$$

wherein the weight vector $w_i^j$ of the $j^{th}$ antenna element in the $i^{th}$ antenna port is expressed as:

$$w_i^j = \frac{1}{\sqrt{N_e N_{BP}}}\exp\left(-2\pi\left((i-1)\frac{d_y}{\lambda}\sin\theta_e + (j-1)\frac{d_z}{\lambda}\cos\theta_e\right)\right),$$

wherein $\theta_e$ is the antenna element downward inclination angle.

6. The method for adjusting the radiating modes of the antenna ports by using the 5G-oriented multidimensional adaptive MIMO system according to claim 5, wherein the weight vectors of the antenna elements in the step S1 are adjusted through the data acquisition terminal according to an adaptive algorithm which adopts a recursive least-squares algorithm.

* * * * *